United States Patent [19]
Won

[11] Patent Number: 6,046,785
[45] Date of Patent: Apr. 4, 2000

[54] ATTACHMENT STRUCTURE OF LIGHT GUIDE TO FRAME FOR LIQUID CRYSTAL DISPLAY DEVICE

[75] Inventor: Se Chang Won, Kyungsangbook-do, Rep. of Korea

[73] Assignee: LG Electronics Inc., Seoul, Rep. of Korea

[21] Appl. No.: 09/060,883

[22] Filed: Apr. 16, 1998

[30] Foreign Application Priority Data

Aug. 30, 1997 [KR] Rep. of Korea ........................ 97-44173

[51] Int. Cl.[7] .................................................. G02F 1/1333
[52] U.S. Cl. ................................ 349/58; 349/60; 349/62; 349/65
[58] Field of Search ................................ 349/60, 62, 65, 349/58

[56] References Cited

U.S. PATENT DOCUMENTS

| | | | |
|---|---|---|---|
| 4,277,817 | 7/1981 | Hehr | 362/31 |
| 4,789,224 | 12/1988 | Bougsty | 350/345 |
| 5,335,100 | 8/1994 | Obata | 359/49 |
| 5,815,227 | 9/1998 | Lee | 349/67 |

*Primary Examiner*—William L. Sikes
*Assistant Examiner*—Walter Malinowski
*Attorney, Agent, or Firm*—Morgan, Lewis & Bockius LLP

[57] ABSTRACT

A liquid crystal display device includes a frame having a settling portion, a lamp positioned within the frame and near a first side of the frame, a light guide positioned within the frame, wherein a cross-section of the light guide decreases with distance from the lamp, the light guide having a groove facing a second side of the frame, a bracket mounted in the settling portion of the frame and having a protrusion corresponding to the groove.

9 Claims, 4 Drawing Sheets

ATTACHMENT STRUCTURE OF LIGHT GUIDE TO FRAME FOR LIQUID CRYSTAL DISPLAY DEVICE

This application claims the benefit of Korean Patent Application No. 97-44173, filed Aug. 30, 1997, which is hereby incorporated by reference.

BACKGROUND OF THE INVENTION

1. Field of the Invention

The present invention relates to a bracket for attaching a light guide to a frame of a liquid crystal display device.

2. Discussion of the Related Art

Generally, a conventional liquid crystal display (LCD) device includes, as shown in FIGS. 1 and 2A, a liquid crystal panel 20 and a back light attached to a frame 19. The back light includes a fluorescent lamp 11, a U-shaped lamp housing 12 enclosing the fluorescent lamp 11, a light diffusing sheet 18, a first prism 17, a second prism 16, a protecting sheet 15, a light guide 13, and a light reflecting sheet 14, all of which are sequentially assembled onto one side of the liquid crystal panel 20. The back light illuminates a display area 21. The display area 21 includes two transparent substrates (not shown) facing each other and having a liquid crystal between them (not shown), and two polarizing panels (not shown) attached to outer sides of the two transparent substrates. The liquid crystal display device further includes a driver circuit 30 for controlling the display area 21.

FIG. 2A is a plan view showing an assembled structure of the light guide 13 and the frame 19, and FIG. 2B is an enlarged view of part A of FIG. 2A. As shown in FIGS. 2A and 2B, the light guide 13 is attached to the frame 19 by mating a protrusion 40 formed at the light guide 13 with a groove 50 formed in the frame 19.

Referring to FIG. 1, the fluorescent lamp 11 at one side of the light guide 13 is turned on, and light from the fluorescent lamp 11 is reflected by the lamp housing 12 and transmitted to the other side of the light guide 13 (opposite the fluorescent lamp 11) through a cross-section of the light guide 13. The light is spread through an entire body of the light guide 13, and the light is again reflected to the display area 21 by the light diffusing sheet 18.

The liquid crystal display device selectively passes the light by controlling pixels using thin film transistors (TFTs) formed on the liquid crystal panel 20 in response to signals from the driver circuit 30. The liquid crystal display device displays a picture and/or video images on the display area 21 of the liquid crystal panel 20 using the pixels to selectively pass the light.

As shown in FIGS. 1, 2A, and 2B, the fluorescent lamp 11 is assembled on one side of the light guide 13 using the lamp housing 12. The light reflecting sheet 14, the light guide 13, the protecting sheet 15, the prisms 16 and 17, the light diffusing sheet 18 and the lamp housing 12 are attached to the frame 19, which is made of plastic. The light guide 13 has a shape such that a cross-section of a side near the fluorescent lamp 11 is larger than the cross-section of the opposite side. Such a shape helps the light spread through the entire body of the light guide 13 uniformly.

The conventional light guide 13 includes the protrusion 40 for mating with the groove 50 of the frame 19. The light guide 13 is mated to the frame 19 by inserting the protrusion 40 into the groove 50.

As shown in FIG. 2B, the protrusion 40 and the groove 50 are of different sizes, so that a small space 10 must remain between the protrusion 40 and the groove 50, and between the light guide 13 and the frame 19. Therefore, the light guide 13 is not firmly attached to the frame 19 and is subject to impacts due to shaking and chafing. The light guide 13 or the frame 19 can crack and/or break due to the impacts, and small pieces broken off from them can scratch the display area 21.

SUMMARY OF THE INVENTION

Accordingly, the present invention is directed to an attachment structure of a light to a frame for a liquid crystal display device that substantially obviates one or more of the problems due to limitations and disadvantages of the related art.

An object of the present invention is to attach a light guide to a frame so as to overcome the problems of the prior art.

Another object of the present invention is to provide an attachment structure in which the light guide is tightly assembled in the frame using a bracket.

Another object of the present invention is to provide an attachment structure in which the light guide does not chafe against the frame due to shaking.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with a first aspect of the present invention there is provided a liquid crystal display device including a light guide having a first fixing means at a first side, a frame having a second fixing means at an inner side facing the first side of the light guide, a bracket having a first portion for mating with the first fixing means, a second portion for mating with the second fixing means, and a third portion for connecting the first portion and the second portion.

In another aspect of the present invention, there is provided a liquid crystal display device including a frame having a settling portion, a lamp positioned within the frame and near -a first side of the frame, a light guide positioned within the frame, wherein a cross-section of the light guide decreases with distance from the lamp, the light guide having a groove facing a second side of the frame, a bracket mounted in the settling portion of the frame and having a protrusion corresponding to the groove.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

DETAILED DESCRIPTION OF THE PREFERRED EMBODIMENT

Reference will now be made in detail to the preferred embodiments of the present invention, examples of which are illustrated in the accompanying drawings.

Figure 1:
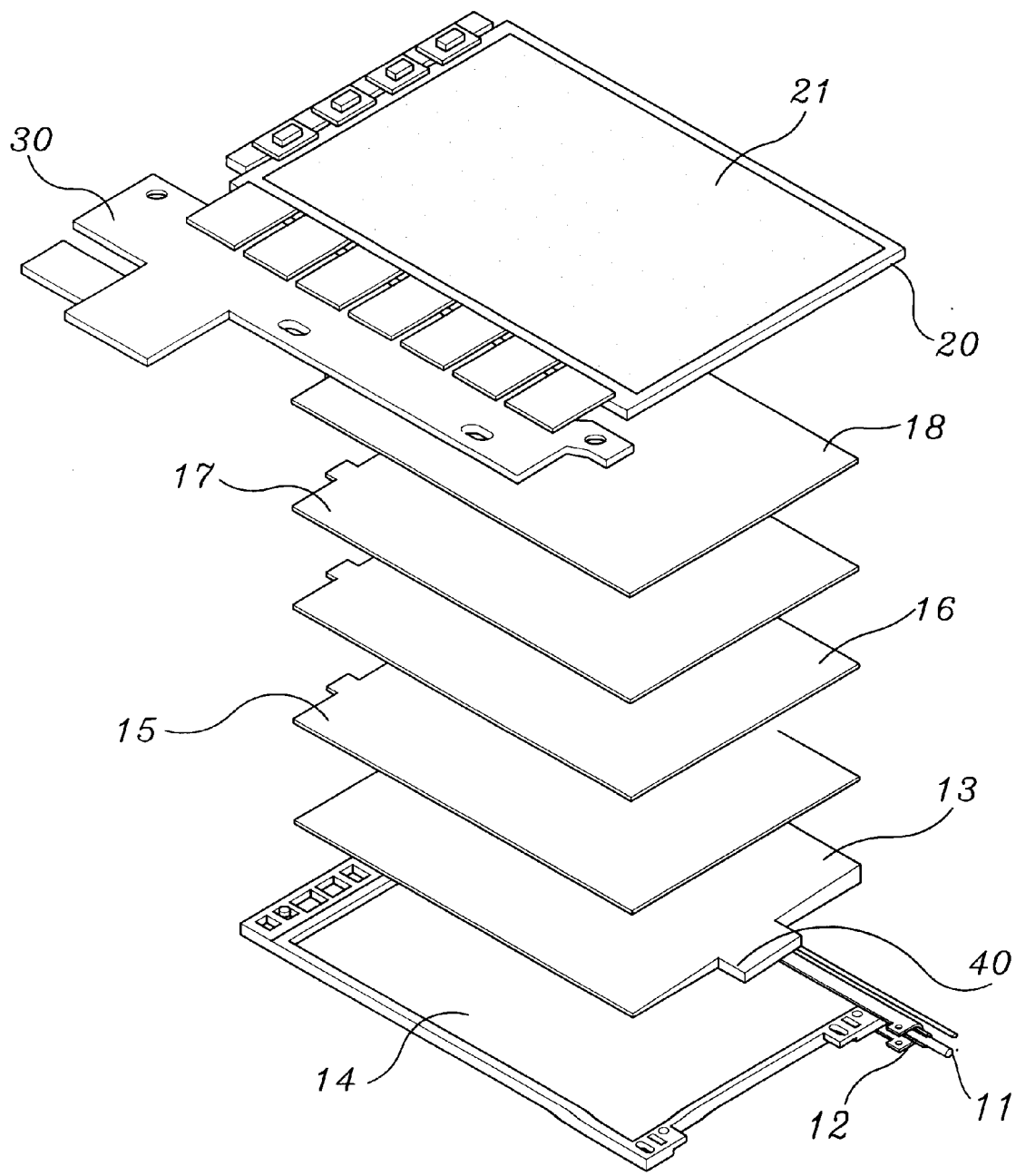
FIG. 1 is a perspective view of a conventional back light device of a liquid crystal display device.
Figure 2A:
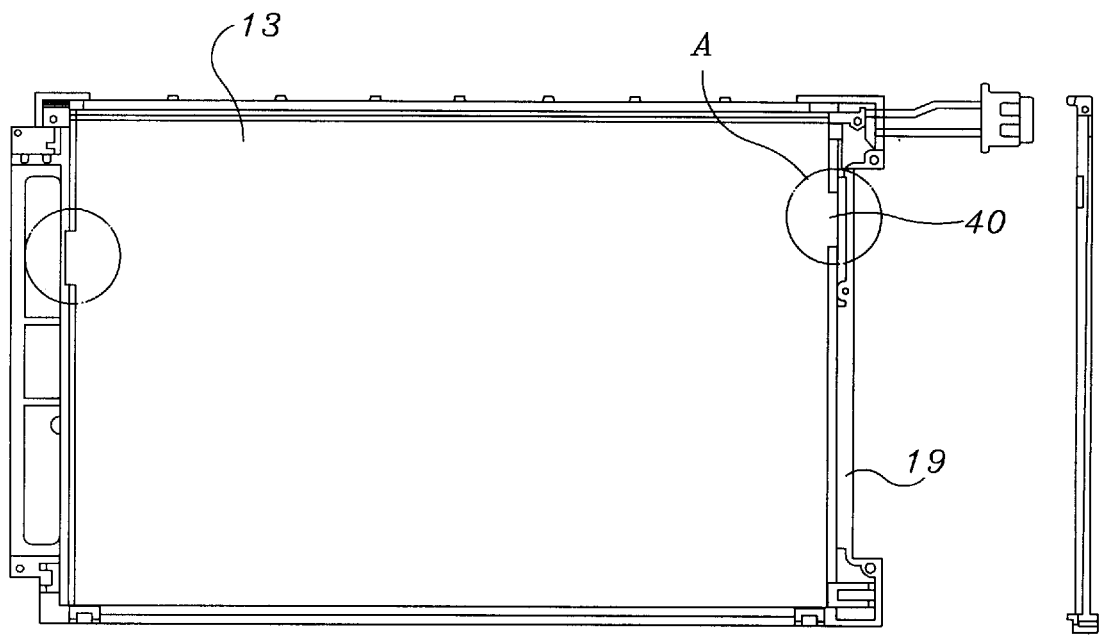
FIGS. 2A and 2B show an assembled structure of a light guide and a frame of the conventional liquid crystal display device.
Figure 2B:
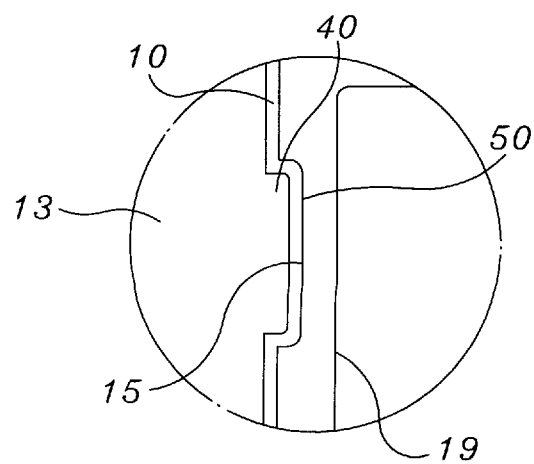
Figure 3A:
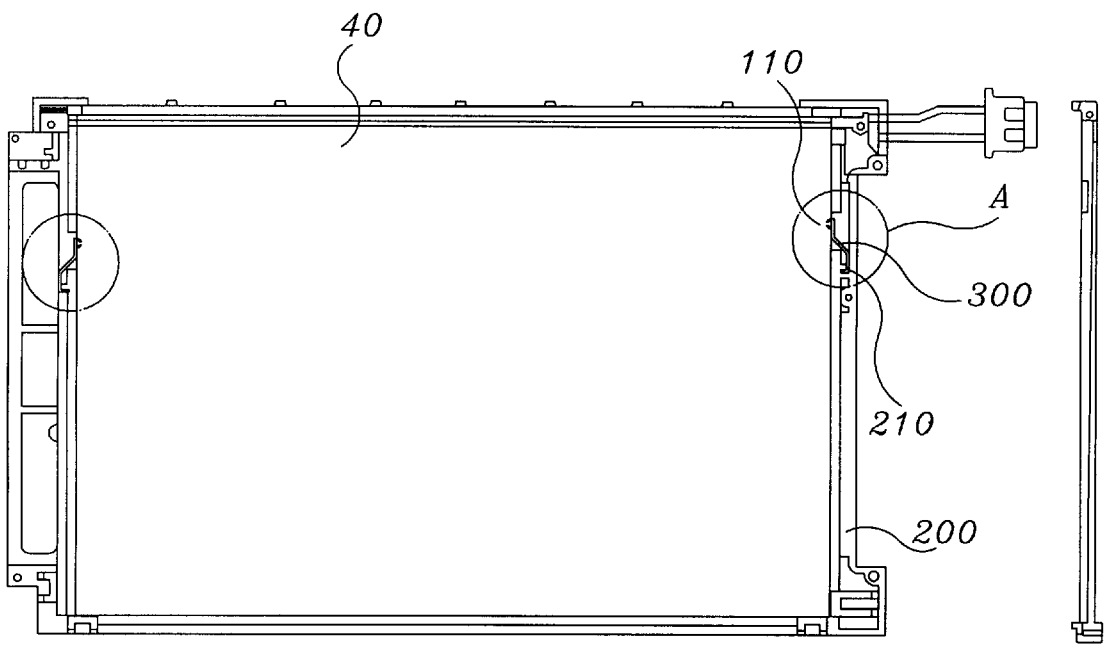
FIGS. 3A and 3B show an assembled structure of a light guide and a frame of the present invention.
Figure 3B:
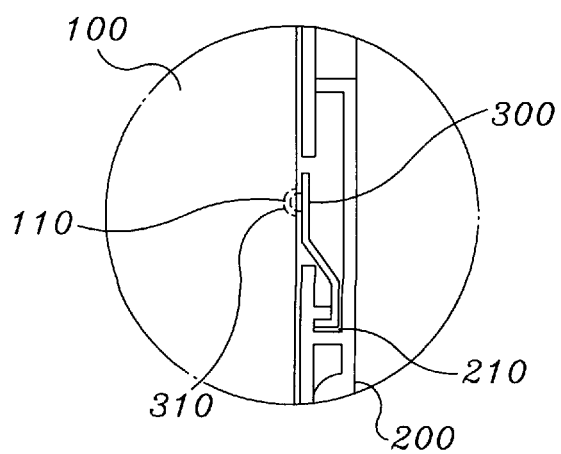

FIG. 3A shows a plan view of an attachment structure of a light guide to a frame according to the present invention, and FIG. 3B is a enlarged view of part A of FIG. 3A. Referring to FIGS. 3A and 3B, the attachment structure of the present invention includes a frame 200 having a holder 210 formed on an inside of the frame 200, a bracket 300 having one end held at the frame 200 and another first end having a protrusion 310. A light guide 100 has a groove 110 (a first fixing means) to correspond to the protrusion 310. The bracket 300 has an elastic body, such as a plate spring, so that when the bracket 300 is inside the frame 200 without the light guide 100, the bracket 300 extends towards the outside of the frame 200 from an inner surface of the frame 200. When the light guide 100 is mated to the frame 200, the groove 110 mates with the protrusion 310, and the bracket 300 is pressed by the light guide 100 towards the inner surface of the frame 200. The bracket 300 supports the light guide 100 and the frame 200 using an elastic force so that the light guide 100 and the frame 200 are firmly assembled without any danger of chafing due to a shaking.

It is preferable that the frame 200 has a settling portion for the bracket 300 at the inside of the frame 200 wherein the settling portion has a holder 210 for assembling the bracket 300 with the frame 200.

Figure 4:
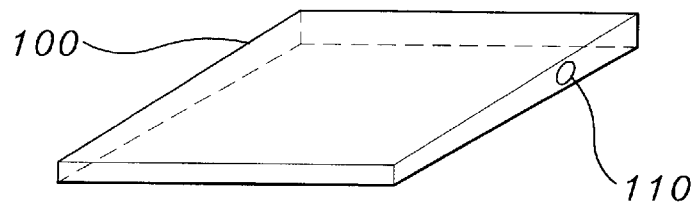
FIG. 4 shows the light guide according to the present invention.
Figure 5:
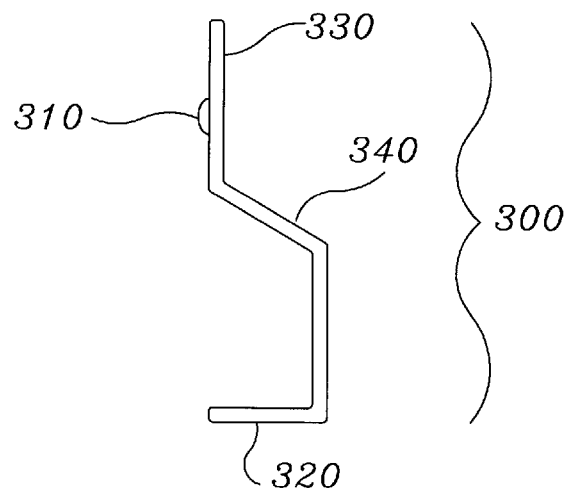
FIG. 5 is a side view showing a spring bracket of the present invention.

The light guide 100 has at least one groove 110 at one side that meets the inner side of the frame 200, as shown in FIG. 4. The groove 110 mates with the protrusion 310, as shown in FIG. 5.

Figure 6:
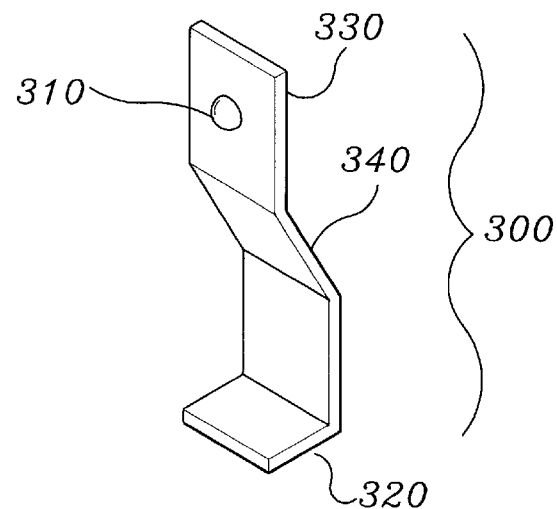
FIG. 6 is a perspective view showing the spring bracket of the present invention.

FIG. 6 shows a perspective view of the bracket 300 including a hook 320 (a second fixing means) for mating to the holder 210, a fixing portion 330 having the protrusion 310, and a spring 340 connecting the hook 320 and the fixing portion 330. When the light guide 100 is being assembled into the frame 200, the fixing portion 330 meets the side of the light guide 100, and the spring 340 is pressed. When the protrusion 310 mates with the groove 110, the bracket 300 is secured by the elastic force of the spring 340. The spring 340 supports the light guide 100 and the frame 200. When a shock is applied to the frame 200, the spring 340 absorbs the shock so as to protect all the elements assembled inside the frame 200.

The light guide 100 preferably has a plurality of grooves on the side. Then the frame 200 has a corresponding number of brackets 300 on the inner side of the frame 200.

In the present invention, the light guide 100 does not chafe against the frame 200 despite shaking, and cannot be cracked and/or broken. Therefore, it is possible to protect the light guide 100 and the frame 200 from harm due to chafing. Furthermore, the bracket 300 has an elastic body to absorb shocks, and thus prevents small pieces from breaking off due to shock and/or chafing.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A liquid crystal display device comprising:

a light guide having a first fixing means at a first side;

a frame having a second fixing means at an inner side facing the first side of the light guide; and a plate spring bracket having a first portion for mating with the first fixing means, a second portion for mating with the second fixing means, and a third portion for connecting the first portion and the second portion.

2. The liquid crystal display device of claim 1, wherein the first fixing means is a groove, and wherein the first portion of the plate spring bracket includes a protrusion corresponding to the groove.

3. A liquid crystal display device comprising:

a light guide having a first fixing means at a first side;

a frame having a second fixing means at an inner side facing the first side of the light guide; and a bracket having a first portion for mating with the first fixing means a second portion for mating with the second fixing means and a third portion for connecting the first portion and the second portion, wherein the second fixing means is a hook extending outward from the inner surface of the frame for holding the second portion of the bracket.

4. A liquid crystal display device comprising:

a light guide having a first fixing means at a first side;

a frame having a second fixing means at an inner side facing the first side of the light guide; and a bracket having a first portion for mating with the first fixing means a second portion for mating with the second fixing means, and a third portion for connecting the first portion and the second portion, wherein the third portion includes an elastic body.

5. The liquid crystal display device of claim 4, wherein the elastic body is a plate spring.

6. A liquid crystal display device comprising:

a frame having a settling portion;

a lamp positioned within the frame and near a first side of the frame;

a light guide positioned within the frame, wherein a cross-section of the light guide decreases with distance from the lamp, the light guide having a groove facing a second side of the frame;

a plate spring bracket mounted in the settling portion of the frame and having a protrusion corresponding to the groove.

7. The liquid crystal display device of claim 6, wherein the plate spring bracket is elastic.

8. A liquid crystal display device comprising:

a frame having a settling portion;

a lamp positioned within the frame and near a first side of the frame;

a light guide positioned within the frame wherein a cross-section of the light guide decreases with distance from the lamp, the light guide having a groove facing a second side of the frame;

a bracket mounted in the settling portion of the frame and having a protrusion corresponding to the groove, wherein the bracket includes a hook portion for engaging the settling portion.

9. The liquid crystal display device of claim 8, wherein the bracket includes a spring portion connecting the hook portion and a portion of the bracket having the protrusion.

* * * * *